US012632504B2

(12) United States Patent
Sejpal et al.

(10) Patent No.: US 12,632,504 B2
(45) Date of Patent: May 19, 2026

(54) RANKING SEARCH RESULTS BASED ON USER INTENT FOR RECIPE INGREDIENTS

(71) Applicant: Maplebear Inc., San Francisco, CA (US)

(72) Inventors: Riddhima Sejpal, Dublin, CA (US); Prakash Putta, Seattle, WA (US); Naval Shah, Toronto (CA); Taesik Na, Issaquah, WA (US); Vinesh Reddy Gudla, South San Francisco, CA (US); Hin-Seng Pang, Richmond Hill (CA)

(73) Assignee: Maplebear Inc., San Francisco, CA (US)

( * ) Notice: Subject to any disclaimer, the term of this patent is extended or adjusted under 35 U.S.C. 154(b) by 90 days.

(21) Appl. No.: 18/752,143

(22) Filed: Jun. 24, 2024

(65) Prior Publication Data

US 2025/0390543 A1 Dec. 25, 2025

(51) Int. Cl.
| *G06F 16/9538* | (2019.01) |
| *G06F 16/9535* | (2019.01) |
| *G06Q 30/0601* | (2023.01) |

(52) U.S. Cl.
CPC ...... *G06F 16/9538* (2019.01); *G06F 16/9535* (2019.01); *G06Q 30/0633* (2013.01); *G06Q 30/0641* (2013.01)

(58) Field of Classification Search
CPC ............. G06F 16/9535; G06F 16/9536; G06F 16/9538; G06F 16/951; G06F 16/953; G06F 16/9532; G06Q 30/0633; G06Q 30/0641
See application file for complete search history.

(56) References Cited

U.S. PATENT DOCUMENTS

| 9,165,320 | B1* | 10/2015 | Belvin .............. G06Q 30/0633 |
| 2006/0175403 | A1* | 8/2006 | Fossen McConnell ...................... G06Q 30/02 235/383 |
| 2014/0279252 | A1* | 9/2014 | Lampert ............ G06Q 30/0633 705/26.62 |
| 2017/0293964 | A1* | 10/2017 | Xie ........................... F21V 3/02 |
| 2017/0316489 | A1* | 11/2017 | Sampara ............ G06Q 30/0631 |
| 2020/0301973 | A1* | 9/2020 | Sewani .............. G06F 16/9035 |
| 2020/0302377 | A1* | 9/2020 | Danducci ............. G06Q 10/087 |
| 2022/0292568 | A1* | 9/2022 | Faurot, III ........ G06F 16/24578 |

* cited by examiner

*Primary Examiner* — Kris E Mackes

(74) *Attorney, Agent, or Firm* — Fenwick & West LLP

(57) ABSTRACT

A user interface of an online system is generated based on search for relevant items that match ingredients of a recipe. After receiving, from a device associated with a user of the online system, a query for an ingredient of a recipe, the online system identifies, based on one or more attributes in the query, a set of candidate items for the ingredient. The online system generates a recipe relevance score for each candidate item by applying a weighted sum of scores, ranks the identified candidate items based on their recipe relevance scores, and selects one or more items for presentation to the user. The online system then generates a user interface of the device with a recipe page including the ingredient of the recipe and the one or more items that match the ingredient of the recipe.

18 Claims, 7 Drawing Sheets

Modal 420

Choose an alternative

X

1 cup Greek Yogurt
Nonfat Plain Greek Yogurt
5.3 oz $1.79
1

Item 405B

Search ...

$4.69 $6.99
Strawberry Greek Yogurt Honey
24 oz

Item 425A

$5.99 $6.99
Vanilla Greek Yogurt
4 x 1.76 oz

Item 425B

$1.79 $1.99
Lemon Less Sugar Greek Yogurt
5.3 oz

Item 425C

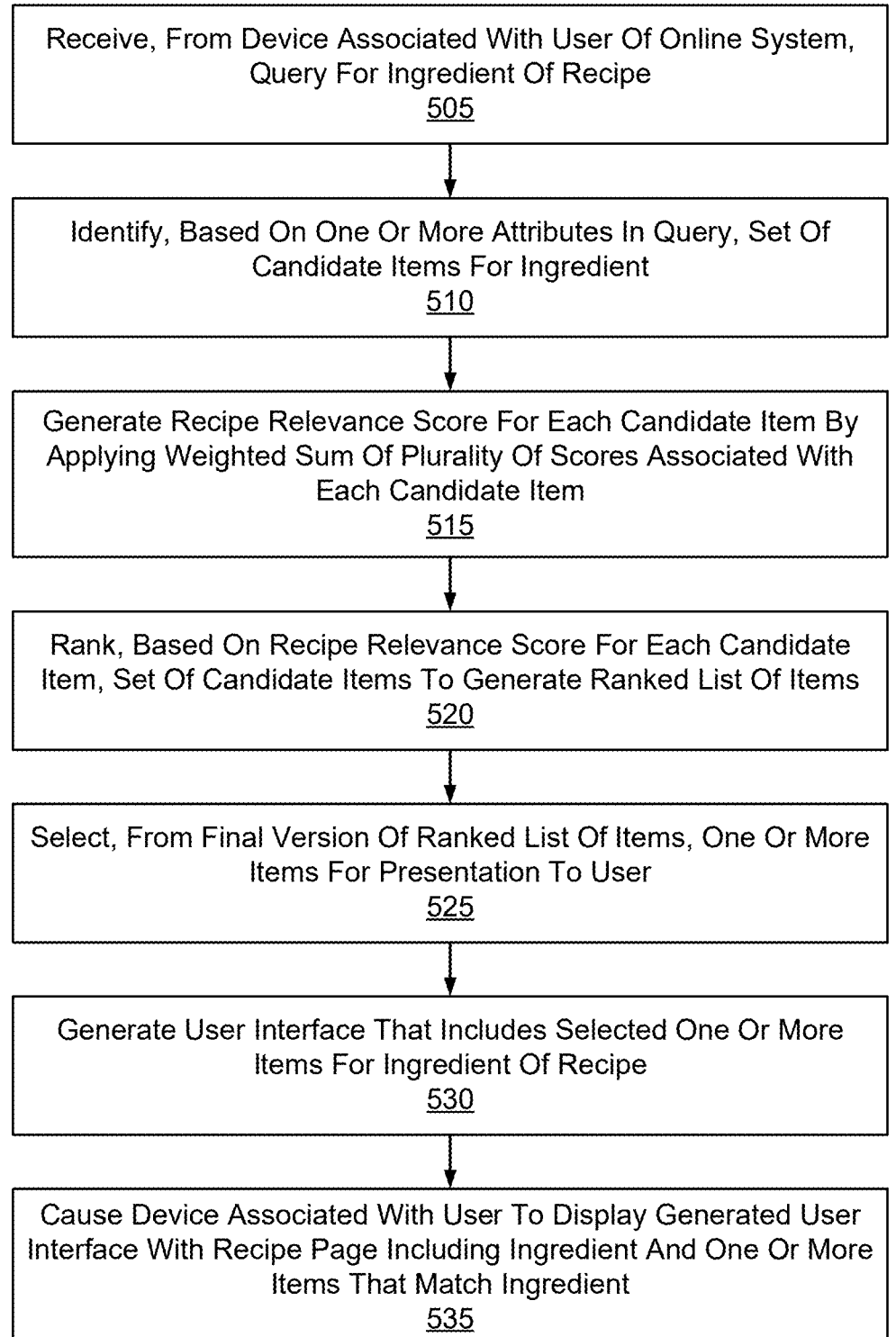

Receive, From Device Associated With User Of Online System,
Query For Ingredient Of Recipe
505

Identify, Based On One Or More Attributes In Query, Set Of
Candidate Items For Ingredient
510

Generate Recipe Relevance Score For Each Candidate Item By
Applying Weighted Sum Of Plurality Of Scores Associated With
Each Candidate Item
515

Rank, Based On Recipe Relevance Score For Each Candidate
Item, Set Of Candidate Items To Generate Ranked List Of Items
520

Select, From Final Version Of Ranked List Of Items, One Or More
Items For Presentation To User
525

Generate User Interface That Includes Selected One Or More
Items For Ingredient Of Recipe
530

Cause Device Associated With User To Display Generated User
Interface With Recipe Page Including Ingredient And One Or More
Items That Match Ingredient
535

FIG. 5

RANKING SEARCH RESULTS BASED ON USER INTENT FOR RECIPE INGREDIENTS

BACKGROUND

Online systems offer to their users options to purchase recipes and/or items that are part of recipes. The recipes may be maintained by third parties or by the online systems. Some search queries that trigger a search engine of an online system come from an intent to fill items for a specific recipe. In particular, the online system can have recipe pages that query the search engine to find specific items that match ingredients from the recipe. However, for these types of searches, the traditional search algorithm that scores search results based in part on predicted conversion likelihoods can return search results that are not appropriate for the recipe.

SUMMARY

Embodiments of the present disclosure are directed to generating a user interface of an online system based on a search for relevant items that match ingredients of a recipe for presentation to a user of the online system.

In accordance with one or more aspects of the disclosure, the online system receives, from a device associated with a user of the online system, a query for an ingredient of a recipe. The online system identifies, based on one or more attributes in the query, a set of candidate items for the ingredient. The online system generates a recipe relevance score for each candidate item from the set of candidate items by applying a weighted sum of a plurality of scores associated with each candidate item. The online system ranks, based on the recipe relevance score for each candidate item, the set of candidate items to generate a ranked list of items. The online system selects, from a final version of the ranked list of items, one or more items for presentation to the user. The online system generates a user interface of the device that includes the selected one or more items for the ingredient of the recipe. The online system causes the device associated with the user to display the generated user interface with a recipe page including the plurality of ingredients and the selected one or more items that match each of the plurality of ingredients.

BRIEF DESCRIPTION OF THE DRAWINGS

FIG. 5 is a flowchart for a method of generating a user interface of an online system based on search for relevant items that match ingredients of a recipe, in accordance with one or more embodiments.

DETAILED DESCRIPTION

Figure 1:
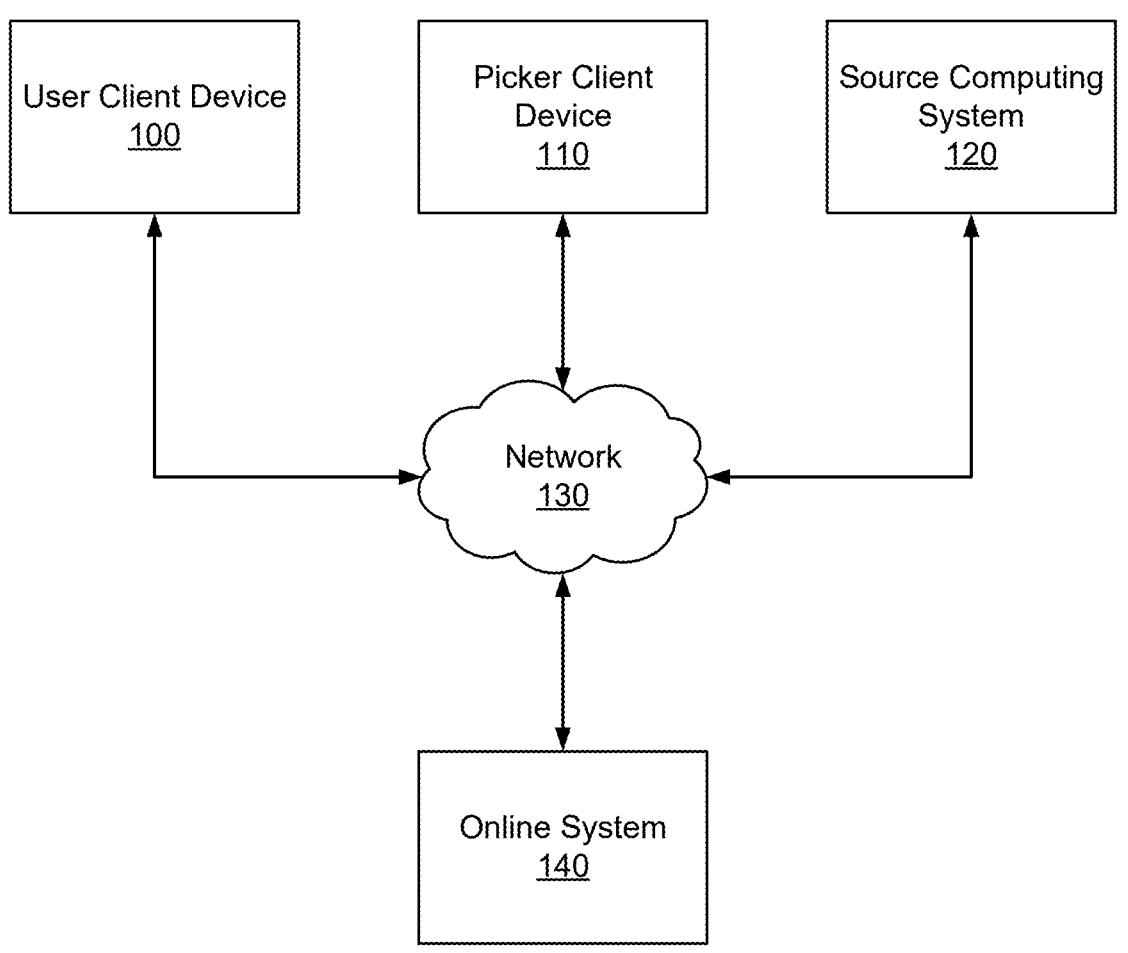
FIG. 1 illustrates an example system environment for an online system, in accordance with one or more embodiments.

FIG. 1 illustrates an example system environment for an online system 140, in accordance with one or more embodiments. The system environment illustrated in FIG. 1 includes a user client device 100, a picker client device 110, a source computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." An "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system 140 and may receive data describing items that are collected by the user and stored in a storage area of the shopping cart. In some embodiments, the smart shopping cart is a picker client device 110 being operated by a picker collecting items within a source location. Similarly, the smart shopping cart may be operated by a user within the source location collecting items for themselves. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a grocery store source. The user's order may specify which groceries they want to be delivered from the grocery store and the quantities of each of the groceries. The user client device 100 transmits the user's order to the online system 140 and the online system 140 selects a picker to travel to the grocery store source location to collect the groceries ordered by the user. The online system transmits an offer to the picker for the picker to service the order in exchange for consideration and, if the picker accepts the offer, the picker collects the groceries from the grocery store. Once the picker has collected the groceries ordered by the user, the picker delivers the groceries to a location transmitted to the picker client device 110 by the online system 140.

The online system 140 allows third parties to create recipe pages defined in part by a list of ingredients. When a user of the online system 140 visits a recipe page, the online system 140 finds specific items for sale that match the generically recited ingredients for the recipe. This is done by querying a search system of the online system 140 with the description of each ingredient. To avoid items that may match the query term but would not be appropriate in the recipe, the online system 140 tunes a search scoring algorithm run by the search system for relevance, and applies any filters specified by a creator of the recipe (e.g., brand filters, health attribute filters, etc.). In this manner, the search scoring algorithm may be optimized to find the most relevant items for a given recipe instead of finding items that would have the highest likelihoods of conversion. The search system integrated into the online system 140 presented herein thus allows for a highly relevant item search for recipe ingredient items while also supporting brand filters, health attribute filters, etc. The presented search system also solves the problem of poor ingredient item match that may be obtained by applying a generic search algorithm.

Note that, if an item search application programming interface (API) of the online system 140 prioritizes items with a high conversion rate, this would result in showcasing items that may not be directly relevant to the recipe ingredient item search. For example, when a recipe calls for bananas, the goal is to display banana items, not items like banana bread that, while popular, do not match the specific need. To address this, a new item search API of the online system 140 is designed to return items with greater relevance to the search query. This means, for example, if bananas are unavailable in a grocery store at the moment, the item search API will not suggest alternative items like banana bread, ensuring that only the most pertinent items are recommended.

Furthermore, the item search API configured for recipe ingredient item search as presented herein can include filters for specific brands and/or health considerations, including vegan and gluten-free options. As the online system 140 enhances recipe landing pages, the need for such filters is becoming more pressing. By adding these filters, the online system 140 will be better equipped to support recipes that call for gluten-free ingredients and/or other dietary restrictions. Moreover, this functionality can be invaluable when a recipe is promoted by a third-party sponsor, as the filters would allow the item search API to specifically retrieve items associated with a specific brand. The online system 140 is described in further detail below with regards to FIG. 2.

Figure 2:
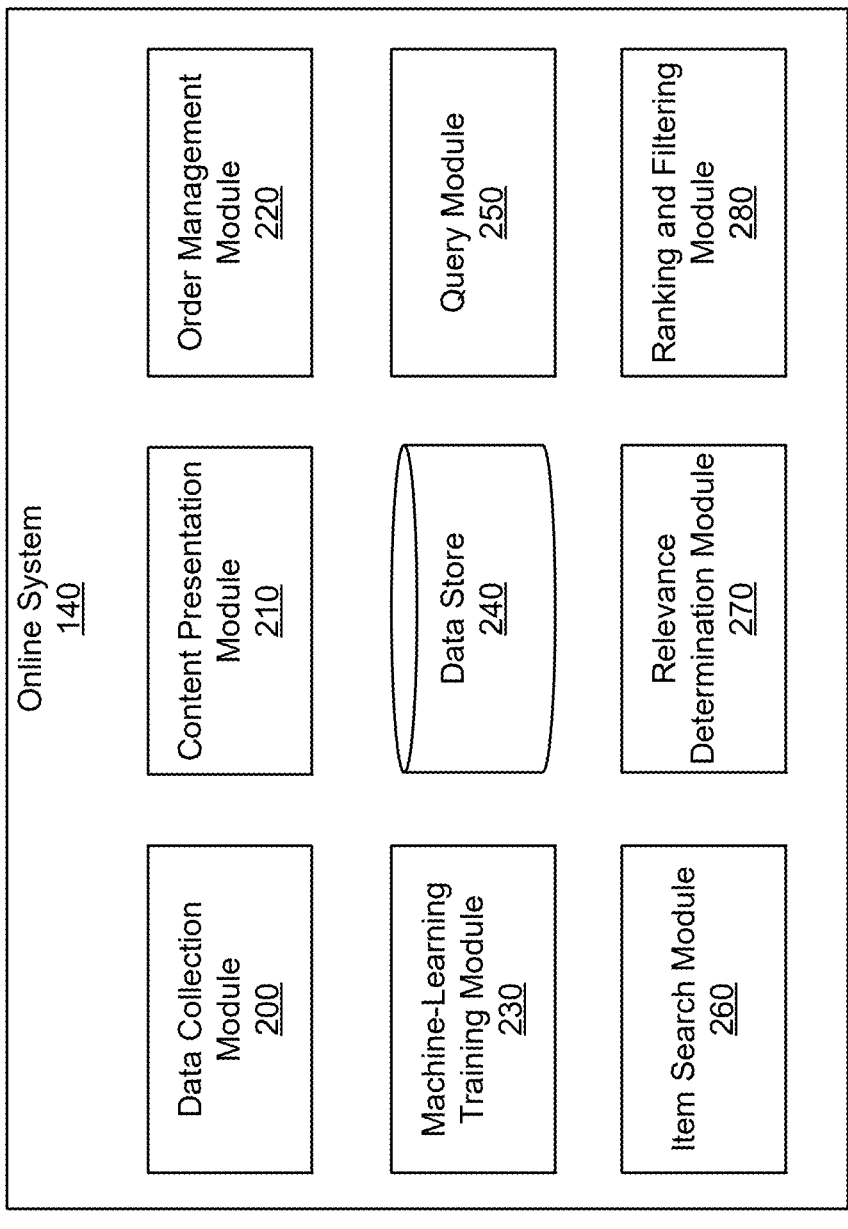
FIG. 2 illustrates an example system architecture for an online system, in accordance with one or more embodiments.

FIG. 2 illustrates an example system architecture for the online system 140, in accordance with some embodiments. The system architecture illustrated in FIG. 2 includes a data collection module 200, a content presentation module 210, an order management module 220, a machine-learning training module 230, a data store 240, a query module 250, an item search module 260, a relevance determination module

270, and a ranking and filtering module 280. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from the source computing system 120, the picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In some embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The query module 250 may receive a query from a recipe page, e.g., triggered by a user of the online system 140 via the user client device 100 who requested viewing of a specific recipe. The query may identify that the request is for the recipe. The query may be for an item associated with an ingredient of the recipe. The query may also include one or more filters (e.g., brand filters, health attribute filters, etc.). In one or more embodiments, the query module 250 receives the query from, e.g., an API associated with a third party that generated the recipe. The received query may include one or more attributes of the ingredient that can be used (e.g., by the item search module 260) for searching for a most relevant item associated with the ingredient. The query module 250 may provide the query along with one or more attributes of the recipe ingredient associated with the query to the item search module 260.

The item search module 260 may run a search algorithm applied to the one or more attributes of the recipe ingredient from the query to identify a set of candidate items from an item database of the online system 140 (e.g., stored at the data store 240) that are the most relevant to the recipe ingredient. Furthermore, the item search module 260 may score each candidate item from the identified set of candidate items, wherein a score associated with each candidate item is indicative of a relevancy of each candidate item to the query (i.e., to the recipe ingredient). The score may have a value between 0 and 1, and a higher value of the score may indicate a higher relevance of a candidate item to a query. In one or more embodiments, the item search module 260 generates a score for each candidate item as a weighed sum of an ESCI (Exact, Substitute, Complementary, Irrelevant) classifier (relevance) score, an embedding score, and/or a string-matching score. When presented with combination of a query and a candidate item, the item search module 260 may determine a relevance of the candidate item to the query through a weighted combination of the ESCI relevance score, the embedding score, and/or the string-matching score.

In one or more embodiments, the item search module 260 generates a score for a given candidate item that is indicative of a relevance of the candidate item to the query (i.e., to the recipe ingredient) by applying the weighted sum of the ESCI relevance score, the embedding score, and the string-matching score, as given by:

$$candidate\_item\_score = w_E * embedding\_score + \tag{1}$$

$$w_R * ESCI\_relevance\_score + w_P * W * is\_primary\_match,$$

where $w_E$, $w_R$, $w_P$ are weights respectively assigned to the embedding score, ESCI relevance score, and a Boolean variable, $W$ represents a number of words in the query, is_primary_match is the primary match Boolean variable that signifies whether all words in the query are present within the item keywords, thus indicating a complete match between the candidate item and the query.

The relevance determination module 270 may apply a set of rules to one or more features of the candidate item to determine the embedding score in equation (1). The one or more features of the candidate item may be, e.g., may be a name of the candidate item, type of the candidate item, brand of the candidate item, price of the candidate item, some other feature of the candidate item or some combination thereof. The embedding score (e.g., value between 0 and 1) may be indicative of a relevance and a likelihood of conversion for the candidate item, where a higher value of the embedding score indicates a higher relevance and likelihood of conversion.

The relevance determination module 270 may further access a classification model (e.g., machine-learning model) that is trained to compute a probability of classification of each candidate item identified by the item search module 260 into a respective class of a plurality of classes. Each class may be associated with a specific type of relevance of that candidate item to the query, e.g., Exact Match, Strong Substitute, Weak Substitute, Close Complement, Remote Complement, Irrelevant, and Offensive. The classification model may be trained to operate as a multiclass classification model that categorizes the set of candidate items identified by the item search module 260 into different buckets or classes given a specific query received by the query module 250.

The relevance determination module 270 may deploy the classification model to run a machine-learning algorithm to generate, based at least in part on the query and one or more features of each candidate item, a classification score associated with each class for each candidate item. The classification score associated with each class for each candidate item may represent (or be interpreted as) a probability of each candidate item belonging to each class. The relevance determination module 270 may then classify, based on the classification score associated with each class for each candidate item, each candidate item into a corresponding type of relevance to the query (e.g., into one of Exact Match class, Strong Substitute class, Weak Substitute class, Close Complement class, Remote Complement class, Irrelevant class, and Offensive class). The relevance determination module 270 may then output an ESCI relevance score for each candidate item that represents a corresponding classification score associated with a bucket (i.e., relevance class) into which that candidate item was classified. A set of parameters for the classification model may be stored at one or more non-transitory computer-readable media of the relevance determination module 270. Alternatively, the set of parameters for the classification model may be stored at one or more non-transitory computer-readable media of the data store 240.

The relevance determination module 270 may feed inputs to the classification model, i.e., the query and information about each candidate item, such as a name of the candidate item, brand of the candidate item, type of the candidate item, etc. Based on the inputs, the classification model may compute a classification score for each class in a set of classes for each candidate item. The set of classes may include, e.g., Exact Match class, Strong Substitute class, Weak Substitute class, Close Complement class, Remote Complement class, Irrelevant class, and Offensive class. Hence, there is one class for each type of relevance to the query.

The classification model may be a multi-class model that includes a two-tower sentence transformer encoder trained to generate embeddings for a query and text data related to a candidate item. The two-tower sentence transformer encoder may include a "query tower" associated with the query and an "item tower" associated with the candidate item. The two-tower sentence transformer encoder of the classification model may generate, based the query and the one or more features of the candidate item, a query embedding related to the query (e.g., output by the "query tower") and an item embedding related to the candidate item (e.g., output by the "item tower").

The classification model may further include a multilayer perceptron neural network head. The multilayer perceptron neural network head receives the query embedding and the item embedding and generates a set of classification outputs for the candidate item, where each classification output is associated with a respective class in the set of classes. The classification model may compute (e.g., via the multilayer perceptron neural network head) a probability of classification of the candidate item into each class by applying a predetermined function (e.g., SoftMax function) to the generated classification outputs. In such a manner, it is satisfied that a sum of probabilities of classification of the candidate item into the set of classes is equal to 1. The probability of classification of the candidate item into each class may represent the classification score associated with each class for the candidate item.

The classification model thus allows feeding in the query and item-related text pairs and generates a probability score (i.e., classification score) for each class in the set of classes for each candidate item indicating how likely the query-item pair is to represent each class. For example, the classification model may generate the probability score (i.e., classification score) of 0.7 for classifying a candidate item into the Strong Substitute class, the probability score of 0.2 for classifying the candidate item into the Exact Match class, the probability score of 0.1 to for classifying the candidate item into the Weak Substitute class, and the probability scores of 0 to all remaining classes in the set of classes. Thus, in this example, the classification model assesses that the candidate item is most likely a Strong Substitute for an item intended by the query.

The classification model may thus output a classification score for each class in the set of classes. After that, the relevance determination module 270 may apply a set of rules to convert the classification scores into class categorization to determine which class (or relevance type) is assigned to a candidate item (i.e., search result). In one or more embodiments, the relevance determination module 270 selects a class with the highest classification score, classifies the candidate item into the selected class that has the highest classification score, and outputs the highest classification score as an ESCI relevance score. In one or more other embodiments, the relevance determination module 270 applies a threshold such that if none of the classes have a sufficiently high classification score, or if multiple classes have classification scores above the threshold or are too close together, then the classification is indeterminate.

The ranking and filtering module 280 may rank all identified candidate items (i.e., search results) based on their relevance scores generated by the item search module 260 (e.g., by applying equation (1)). Additionally, the ranking and filtering module 280 may apply one or more filters (e.g., from the query) to the ranked candidate items to obtain a final ranked list of candidate items. In one or more embodiments, the ranking and filtering module 280 may filter candidate items by specific brand identifiers. As an ingredient name of a recipe may be received in a plain text format, the query module 250 may extract one or more brand names from an ingredient string (which is part of a query) and then subsequently fetch one or more brand identifiers (e.g., from the data store 240) based on the extracted brand names. The query module 250 may then pass the fetched brand identifiers to the ranking and filtering module 280 that generates the filters based on the brand identifiers.

In one or more other embodiments, the query module 250 extracts one or more health tags, e.g., organic, vegan, sugar free, etc. from the query and passes the extracted health tag(s) to the ranking and filtering module 280. The ranking and filtering module 280 may then generate one or more health-related filters based on the extracted health tag(s) and filter the ranked list of candidate items by applying the one or more health-related filters. Additionally or alternatively, the query module 250 may extract one or more dietary restriction tags from the query (i.e., ingredient string) and pass the extracted dietary restriction tag(s) to the ranking and filtering module 280. The ranking and filtering module 280 may then generate one or more dietary restriction filters based on the dietary restriction tag(s) and filter the ranked list of candidate items by applying the one or more dietary restriction filters. Once the filtering is applied, the ranking and filtering module 280 generates a final filtered ranked list of items and passes the final filtered ranked list of items to, e.g., the content presentation module 210.

The content presentation module 210 may receive, from the ranking and filtering module 280, the final filtered ranked list of candidate items. In one or more embodiments, the content presentation module 210 selects, for presentation to the user, only a highest ranked item (i.e., "top match" or the most relevant item) from the final filtered ranked list of candidate items for each ingredient of a recipe. The content presentation module 210 may then cause the user client device 100 to display a user interface with a recipe page that shows ingredients of a recipe and the single most relevant item associated with each ingredient. The user interface with the recipe page may allow the user to add the most relevant item associated with each recipe ingredient to a shopping cart for conversion. Alternatively, the content presentation module 210 may select, for presentation to the user, a predetermined number of highest ranked items from the final filtered ranked list of candidate items for each ingredient of a recipe. The content presentation module 210 may then cause the user client device 100 to display a user interface with a recipe page that shows ingredients of a recipe and multiple ranked relevant items (e.g., $2^{nd}$ highest ranked item, $3^{rd}$ highest ranked item, etc.) associated with each ingredient. The user interface with the recipe page may allow the user to add any of the ranked relevant items associated with each recipe ingredient to a shopping cart for conversion.

The item search module 260 (or some other module of the online system 140) may collect feedback data with information about conversion by the user of an item associated with each recipe ingredient. The item search module 260 may then use the collected feedback data to tune one or more of the weights $w_E$, $w_R$, $w_P$ assigned in accordance with equation (1) to the embedding score, the ESCI relevance score, and the primary match Boolean variable, respectively. In this manner, the relevance-based search of the online system 140 presented herein can be continuously improved based on explicit feedback from users about relevance of items to recipe ingredients.

The machine-learning training module 230 may perform initial training of the classification model using training data. The machine-learning training module 230 may generate the training data by collecting pairs of a query text and an item description text obtained from engagement data (e.g., impression data and/or conversion data) for a collection of users of the online system 140. Alternatively or additionally, the machine-learning training module 230 may generate the training data by collecting evaluation of pairs of queries and items by a group of human raters (e.g., users of the online system 140) in accordance with the aforementioned multi-class framework. The group of human raters may provide labels for each class in the set of classes given an item-query pair (or a user-item pair). The machine-learning training module 230 may train the classification model using the training data to generate initial values for the set of parameters of the classification model.

The machine-learning training module 230 may further collect feedback data with information about conversion by the user of an item associated with each recipe ingredient that is displayed at the recipe page. The machine-learning training module 230 may then re-train the classification model by updating the set of parameters of the classification model using the collected feedback data. As more user engagement data (e.g., conversion data) are collected over time, the machine-learning training module 230 may continually re-train the classification model to continue improving accuracy and performance of the classification model on the latest queries about recipe ingredients and identified candidate items.

The enhancement of item search API and the inclusion of brand-specific and health-related filters at the online system 140 represent significant improvements with far-reaching impacts. First, the online system 140 presented herein provides for enhanced search accuracy and relevance. The focus of the item search API on relevance over conversion rates directly addresses user needs, ensuring that search results are more aligned with the specific ingredients requested in recipes. This precision can drastically reduce the mismatch between user queries and suggested items, such as avoiding the case of seeking bananas but being shown banana bread. Second, the online system 140 presented herein provides for improved user experience. By providing search results that closely match the users' dietary needs and preferences, the online system 140 can offer a more personalized shopping experience. Users with specific health-related dietary restrictions, like gluten-free or vegan diets, can find it easier to shop without having to manually sift through irrelevant options.

Third, the online system 140 presented herein provides support for dietary restrictions. The integration of health and brand filters into the search function represents a significant change for users with dietary restrictions. This feature ensures that users can easily find items that meet their specific dietary needs, enhancing the platform's inclusivity and accessibility. Fourth, the online system 140 presented herein provides for increased brand visibility and marketing opportunities. The ability of the online system 140 to filter candidate items by brand is particularly beneficial for sponsored recipes or items, allowing brands to gain more visibility among their target audience. This can open up new marketing opportunities and partnerships, benefiting both the online system 140 and the brands it hosts. In overall, the development of a more relevant search API and the introduction of specific filters for brand and health considerations can significantly impact both the user experience and the market position of the online system 140.

Figure 3:
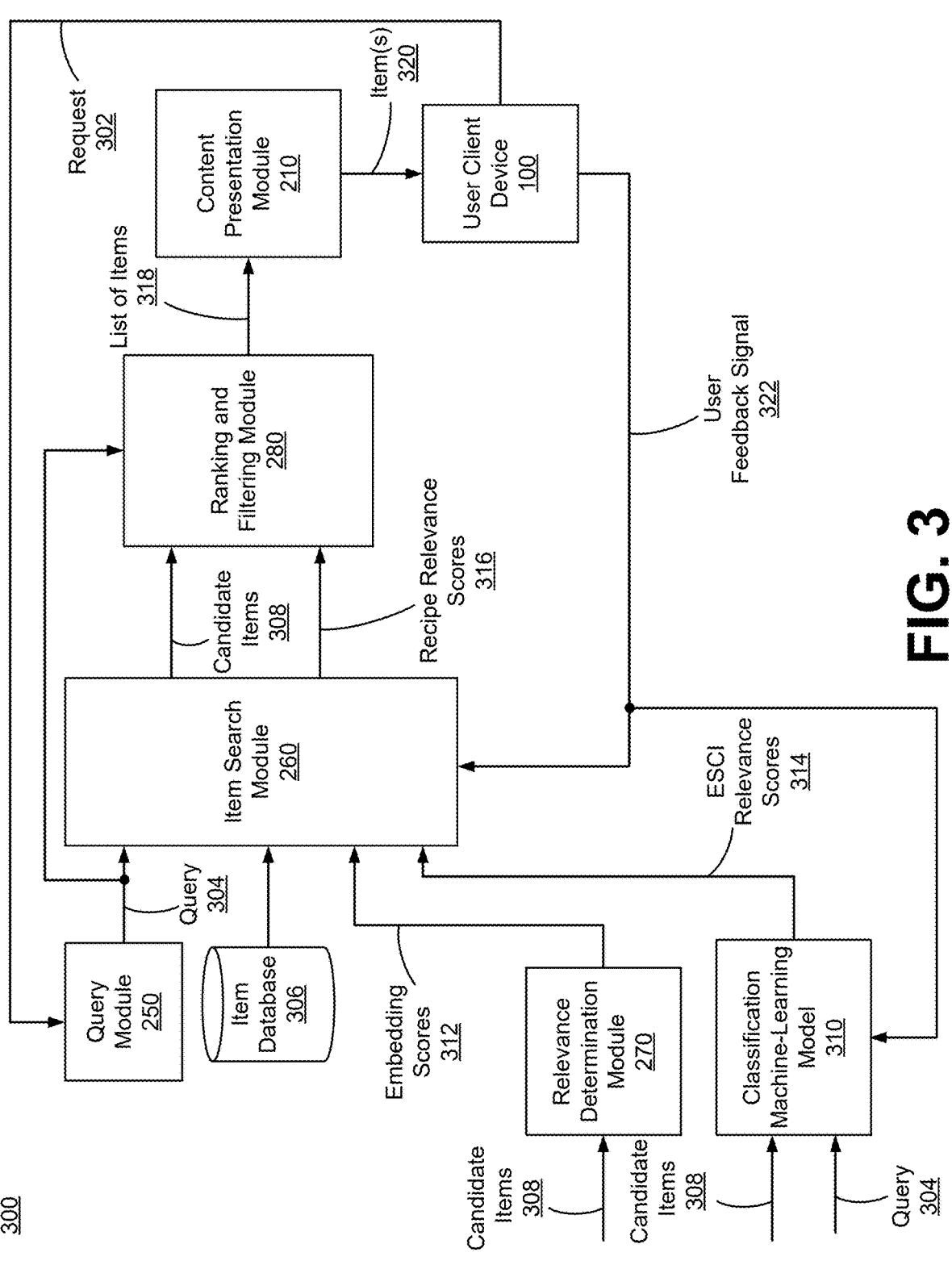
FIG. 3 illustrates an example architectural flow diagram for generating a user interface of an online system based on search for relevant items that match ingredients of a recipe, in accordance with one or more embodiments.

FIG. 3 illustrates an example architectural flow diagram 300 for generating a user interface of an online system based on search for relevant items that match ingredients of a recipe, in accordance with one or more embodiments. Upon receiving a request 302 from the user client device 100 for a recipe page, the query module 250 may generate a query 304 for each ingredient of the recipe. The query module 250 may pass the query 304 to the item search module 260. The item search module 260 may first apply a search algorithm on one or more attributes of a recipe ingredient from the query 304 to identify candidate items 308 from an item database 306 of the online system 140 (e.g., stored at the data store 240). The candidate items 308 may represent items that are the most relevant to the query 304 (i.e., the recipe ingredient associated with the query 304). The item search module 260 may pass information about the candidate items 308 to the ranking and filtering module 280, as well as to the relevance determination module 270 and a classification machine-learning model 310 of the online system 140.

The relevance determination module 270 may apply a set of rules to one or more features of each candidate item 308 to determine an embedding score 312 for each candidate item 308 that is indicative of a relevance and likelihood of conversion for each candidate item 308. The relevance determination module 270 may pass embedding scores 312 for the candidate items 308 to the item search module 260. The classification machine-learning model 310 may run a machine-learning algorithm to generate, based on the query 304 and one or more features of each candidate item 308, a classification score associated with each relevance class for each candidate item. The classification machine-learning model 310 may then output an ESCI relevance score 314 for each candidate item 308 that represents a classification score associated with a relevance class into which that candidate item 308 was classified. The classification machine-learning model 310 may pass ESCI relevance scores 314 for the candidate items 308 to the item search module 260.

In addition to identifying the candidate items 308 that are the most relevant to the query 304 (i.e., the recipe ingredient), the item search module 260 generates a recipe relevance score 316 for each candidate item 308, based on the query 304, the embedding score 312 for each candidate item 308, and the ESCI relevance score 314 for each candidate item 308, e.g., in accordance with equation (1). The recipe relevance score 316 for each candidate item 308 may be a value (e.g., between 0 and 1) that is indicative of a relevance of each candidate item 308 to the recipe where higher values indicate higher level of relevance. The item search module 260 may pass the recipe relevance scores 316 for the candidate items 308 to the ranking and filtering module 280.

The ranking and filtering module 280 may rank the candidate items 308 based on their recipe relevance scores 316 to generate a ranked list of candidate items. Additionally, the ranking and filtering module 280 may apply one or more filters (e.g., brand filters, health attribute filters, dietary filters, etc.) to the ranked list of candidate items to obtain a final list of candidate items 318. The one or more filters may be derived from the query 304, e.g., by the ranking and filtering module 280 or the query module 250. The ranking and filtering module 280 may pass the final list of candidate items 318 to the content presentation module 210.

The content presentation module 210 may select one or more items 320 from the final list of candidate items 318 for presentation to the user. In one or more embodiments, the content presentation module 210 selects only a highest ranked item (i.e., "top match" or the most relevant item) from the final list of candidate items 318 for each ingredient of the recipe. The content presentation module 210 may then generate a user interface with a recipe page displayed at the user client device 100 that shows ingredients of a recipe and the single most relevant item 320 associated with each recipe ingredient. Alternatively, the content presentation module 210 may select, for presentation to the user, a predetermined number of highest ranked items from the final list of candidate items 318 for each ingredient of the recipe. The content presentation module 210 may then generate a user interface with a recipe page displayed at the user client device 100 that shows ingredients of a recipe and multiple ranked relevant items 320 (e.g., $2^{nd}$ highest ranked item, $3^{rd}$ highest ranked item, etc.) associated with each ingredient.

The user interface with the recipe page may allow the user to add any displayed item associated with each recipe ingredient to a shopping cart for conversion. The conversion data generated by the user may be recorded at the user client device 100 as a user feedback signal 322 associated with the displayed recipe page. The user feedback signal 322 may be a digital signal that includes information about engagement by the user with items associated with ingredients of the recipe that are displayed at the user interface of the user client device 100. The user feedback signal 322 can be used by the item search module 260 to tune one or more of the weights assigned to the embedding score 312, the ESCI relevance score 314, and/or the primary match used for computation of a recipe relevance score 316 for a corresponding candidate item 308. In this manner, the relevance-based search of the item search module 260 can be continuously improved based on explicit feedback from users about relevance of items to recipe ingredients. Additionally, the machine-learning training module 230 may utilize the user feedback signal 322 to re-train the classification model 405. By utilizing the user feedback signal 322, the machine-learning training module 230 may update the set of parameters of the classification machine-learning model 310, and continuously improve the machine-learning algorithm of the classification machine-learning model 310.

Figure 4A:
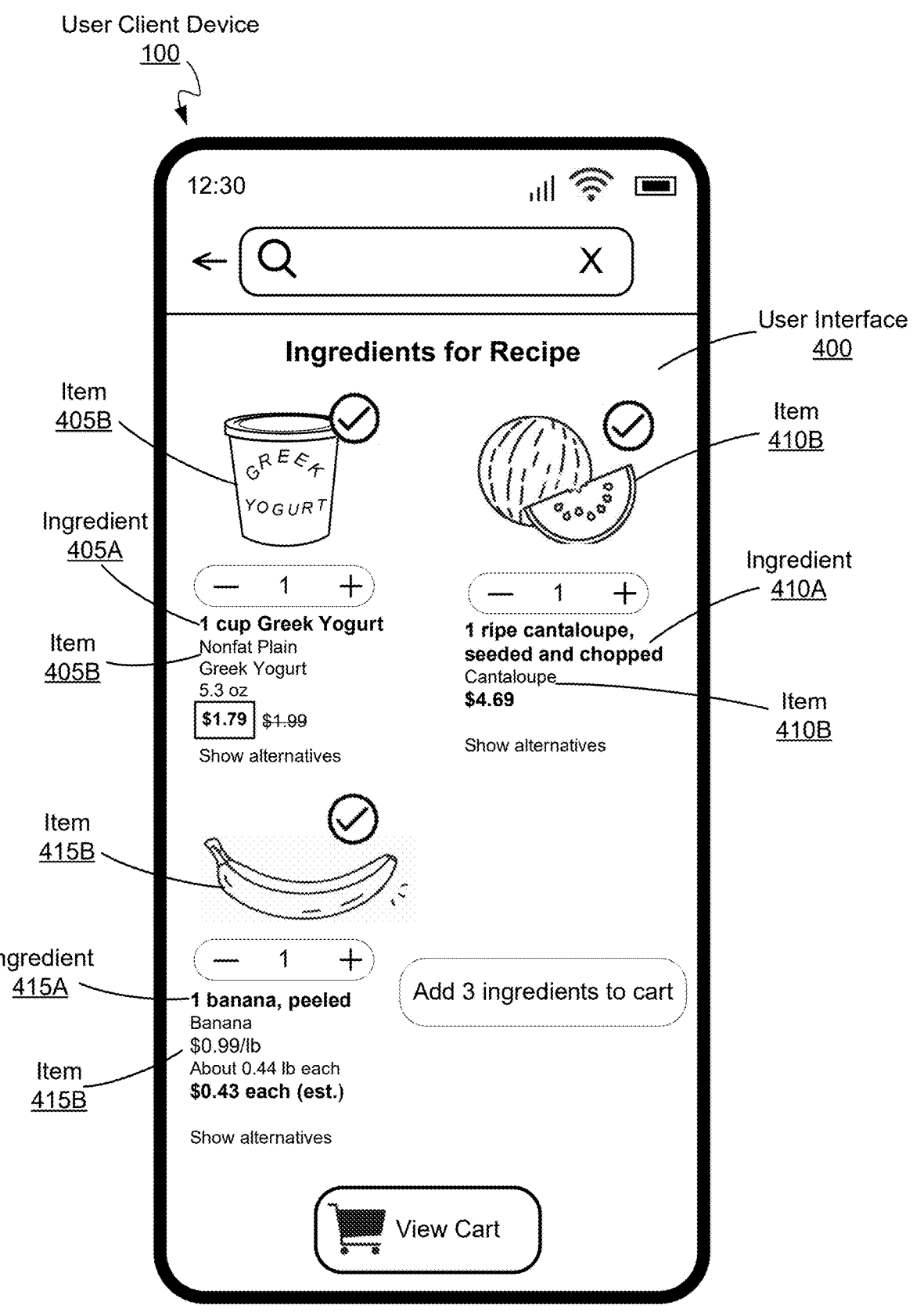
FIG. 4A illustrates an example user interface with a recipe page displayed at a device associated with a user of an online system, in accordance with one or more embodiments.

FIG. 4A illustrates an example user interface 400 with a recipe page displayed at the user client device 100, in accordance with one or more embodiments. The recipe page of the user interface 400 includes an ingredient 405A (e.g., "1 cup Greek yogurt"), an ingredient 410A (e.g., "1 ripe cantaloupe seeded and chopped"), and an ingredient 415A (e.g., "1 banana, peeled"), as well as items 405B (e.g., "Nonfat Plain Greek Yogurt"), 410B (e.g., "Cantaloupe") and 415B (e.g., "Banana"), where each item 405B, 410B, 415B represents a top match (i.e., the most relevant match with the highest rank among candidate items) for a respective ingredient 405A, 410A, 415A. It should be noted that, for example, "1 cup" in the name of ingredient 405A is a measurement and "Greek yogurt" is a search term that is used to identify the item 405B. The user can utilize the user interface 400 to add one or more items 405B, 410B, 415B and their desired quantities to a shopping cart.

Figure 4B:
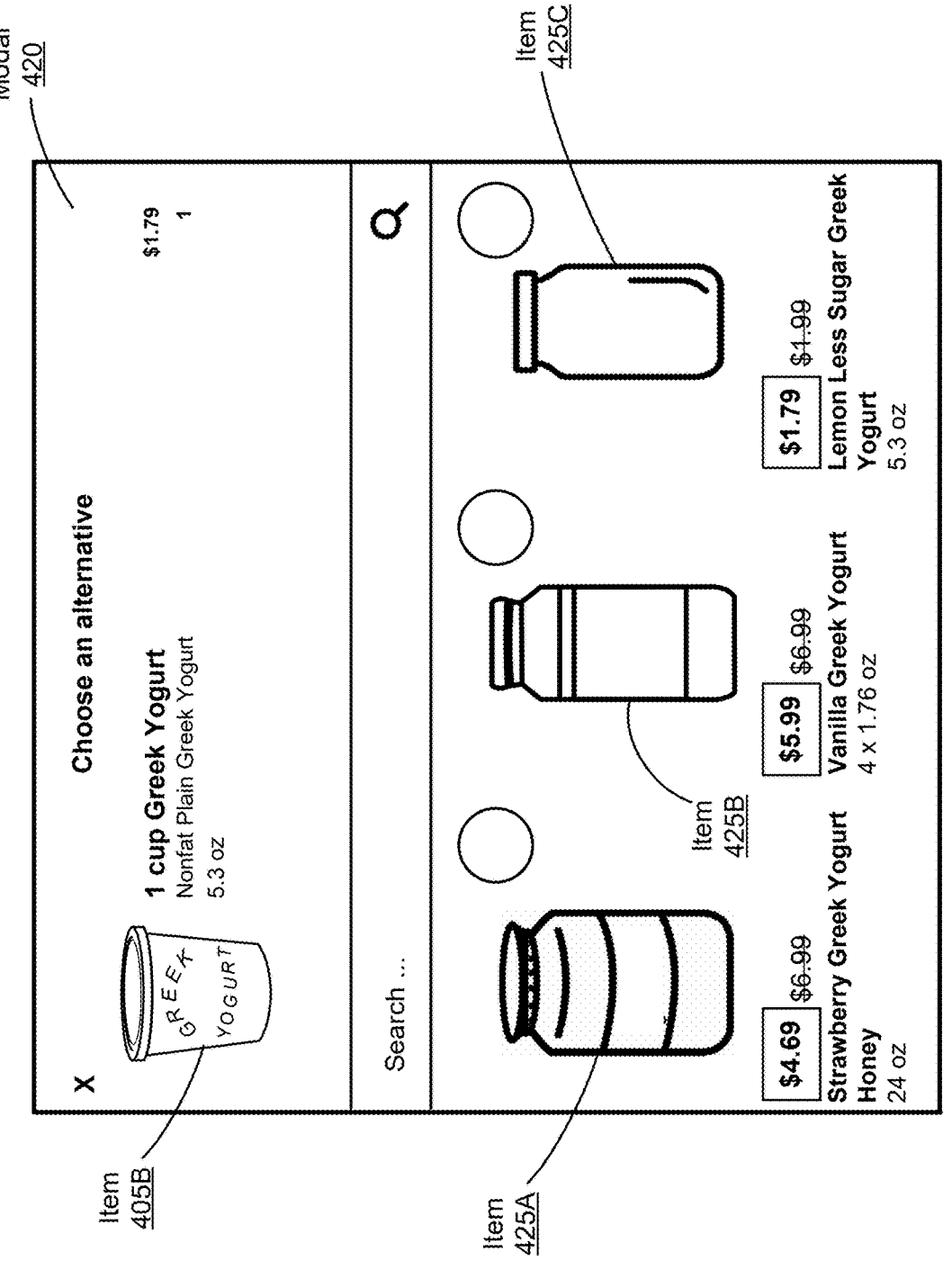
FIG. 4B illustrates an example user interface with a recipe page and a modal with alternative items displayed at a device associated with a user of an online system, in accordance with one or more embodiments.

The recipe page of the user interface 400 has an option "show alternatives" for each item displayed at the recipe page. A user can utilize the "show alternatives" option when he or she wants to search for items that are alternatives to a recommended ingredient item. For example, when the user clicks on the "show alternatives" link associated with the ingredient 405A and the item 405B, a modal 420 as shown in FIG. 4B is opened at the user interface 400 that shows alternative items 425A, 425B, 425C. Note that the items 425A, 425B, 425C in FIG. 4B may represent the second, third and fourth ranked items in the final ranked list of items obtained by the ranking and filtering module 280 and provided to the content presentation module 210. The user can utilize the modal 420 to add one or more alternative items 425A, 425B, 425C to a shopping cart.

Figure 4C:
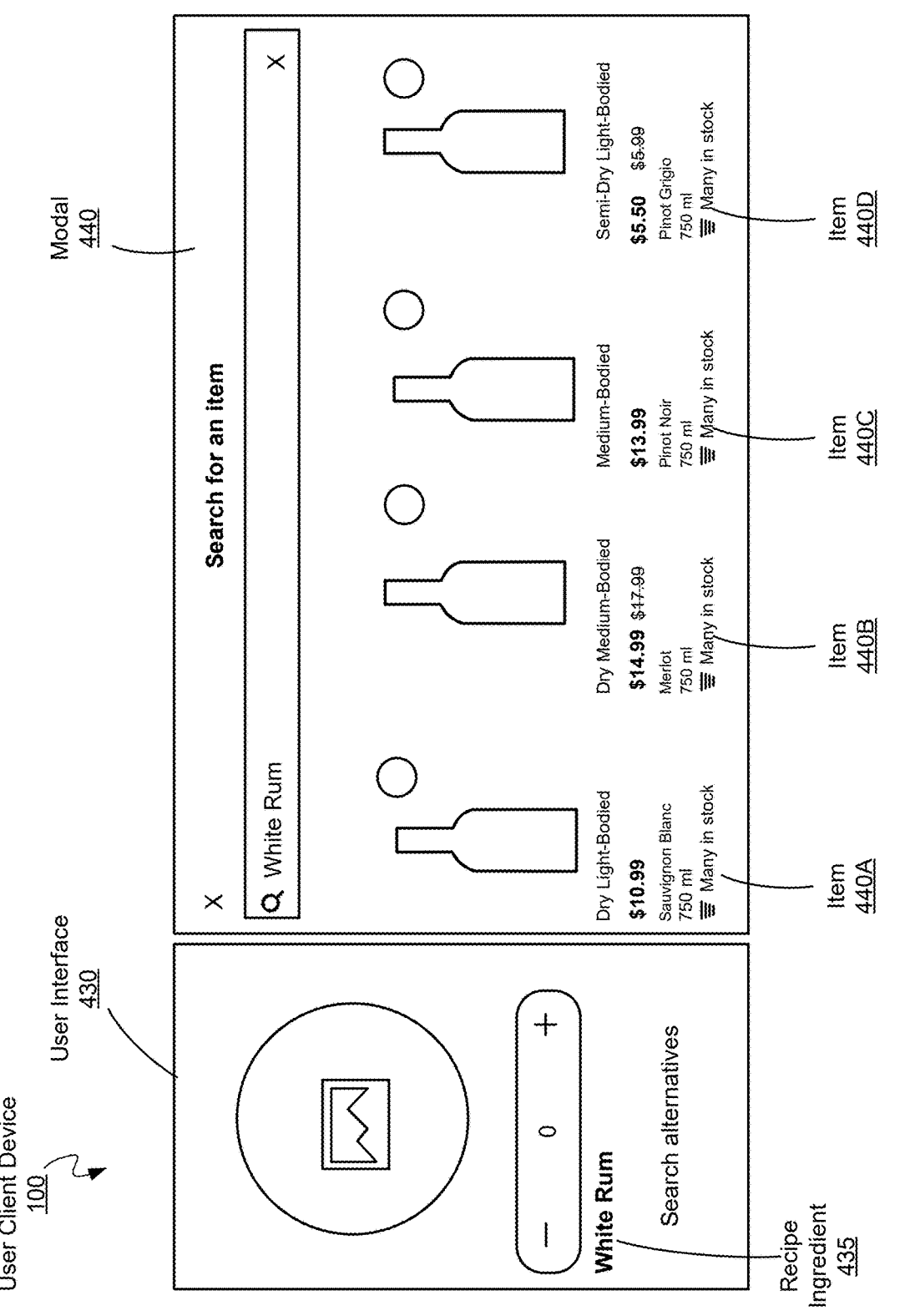
FIG. 4C illustrates an example user interface displayed at a device associated with a user of an online system with a portion of a recipe page having an ingredient for which no relevant item was found, in accordance with one or more embodiments.

FIG. 4C illustrates an example user interface 430 of the user client device 100 with a portion of a recipe page having an ingredient for which no relevant item was found, in accordance with one or more embodiments. The user interface 430 shows a recipe ingredient 435 (e.g., "White Rum") for which no top match item or alternatives are found. In such cases, the content presentation module 210 causes the user interface 430 to display "search alternatives" option next to the recipe ingredient 435. When the user clicks on the "show alternatives" link associated with the recipe ingredient 435, a modal 440 opens that displays alternative items 445A, 445B, 445C, 445D (e.g., as identified by the item search module 260). The user can utilize the modal 440 to add one or more alternative items 445A, 445B, 445C, 445D to a shopping cart.

FIG. 5 is a flowchart for a method of generating a user interface of an online system based on search for relevant items that match ingredients of a recipe, in accordance with one or more embodiments. Alternative embodiments may include more, fewer, or different steps from those illustrated in FIG. 5, and the steps may be performed in a different order from that illustrated in FIG. 5. These steps may be performed by an online system (e.g., the online system 140). Additionally, each of these steps may be performed automatically by the online system without human intervention.

The online system 140 receives 505 (e.g., via the query module 250), from a device associated with a user of the online system 140 (e.g., the user client device 100), a query for an ingredient of the recipe. The online system 140 identifies 510 (e.g., via the item search module 260), based on one or more attributes in the query, a set of candidate items for the ingredient. The online system 140 generates 515 (e.g., via the item search module 260) a recipe relevance score for each candidate item from the set of candidate items by applying a weighted sum of a plurality of scores associated with each candidate item.

The online system 140 may scale (e.g., via the item search module 260) an embedding score for each candidate item with a first weight assigned to the embedding score to generate a first weighted score of the plurality of scores, the embedding score indicative of a relevance for the user of each candidate item to the query and of a likelihood of conversion by the user of each candidate item. The online system 140 may scale (e.g., via the item search module 260) a classification score for each candidate item with a second weight assigned to the classification score to generate a second weighted score of the plurality of scores, the classification score indicative of a relevance class of a plurality of relevance classes to which each candidate item belongs. The online system 140 may scale (e.g., via the item search module 260) a Boolean variable with a number of words in the query and a third weight assigned to each candidate item to generate a third weighted score of the plurality of scores, the Boolean variable indicative of whether each candidate item represents a complete match for the query. The online system 140 may aggregate (e.g., via the item search module 260) the first, second and third weighted scores to generate the recipe relevance score for each candidate item.

The online system 140 may identify (e.g., via the item search module 260) that each candidate item represents the complete match for the query when a plurality of words in the query are present within a set of keywords of each candidate item. The online system 140 may access a classification machine-learning model of the online system 140 (e.g., via the relevance determination module 270), wherein the classification machine-learning model is trained to identify a likelihood of classification of each candidate item into each relevance class of the plurality of relevance classes, each relevance class associated with a type of relevance to the query. The online system 140 may apply the classification machine-learning model (e.g., via the relevance determination module 270) to generate, based at least in part on the query and one or more features of each candidate item, an intermediate classification score associated with each relevance class for each candidate item, the intermediate classification score being indicative of the likelihood of classification. The online system 140 may generate (e.g., via the relevance determination module 270), based on the intermediate classification score associated with each relevance class, the classification score for each candidate item that is indicative of a type of relevance of each candidate item to the query.

The online system 140 ranks 520 (e.g., via the ranking and filtering module 280), based on the recipe relevance score for each candidate item, the set of candidate items to generate a ranked list of items. The online system 140 may generate (e.g., via the ranking and filtering module 280) one or more filters from the query. The online system 140 may filter (e.g., via the ranking and filtering module 280), using the one or more filters, at least one item from the ranked list of items to generate a final version of the ranked list of items.

In one or more embodiments, the online system 140 extracts (e.g., via the query module 250) one or more brand names from a string associated with the ingredient. The online system 140 may then fetch (e.g., via the ranking and filtering module 280), from a database of the online system 140 (e.g., the data store 240), one or more brand identifiers associated with the one or more brand names. The online system 140 may generate (e.g., via the ranking and filtering module 280), based on the one or more brand identifiers, the one or more filters. Alternatively or additionally, the online system 140 may extract (e.g., via the query module 250) one or more health-related tags from a string associated with the ingredient. The online system 140 may then generate (e.g., via the ranking and filtering module 280), based on the one or more health-related tags, the one or more filters.

The online system 140 selects 525 (e.g., via the content presentation module 210), from a final version of the ranked list of items, one or more items for presentation to the user. The online system 140 generates 530 (e.g., via the content presentation module 210) a user interface of the device that includes the selected one or more items for the ingredient of the recipe. The online system 140 causes 535 (e.g., via the content presentation module 210) the device associated with the user to display the generated user interface with a recipe page including the ingredient and the selected one or more items that match each the ingredient.

In one or more embodiments, the online system 140 selects (e.g., via the content presentation module 210), from the final version of the ranked list of items, an item having a highest recipe relevance score among all items in the final version of the ranked list of items. The online system 140 may then generate (e.g., via the content presentation module 210) the user interface including the ingredient and the selected item that matches the ingredient. Alternatively, the online system 140 may select (e.g., via the content presentation module 210), from the final version of the ranked list of items, a set of items having highest recipe relevance scores among all items in the final version of the ranked list of items. The online system 140 may then generate (e.g., via the content presentation module 210) the user interface including the ingredient and the selected set of items representing a ranked list of matches for the ingredient allowing the user to add any of the selected set of items to a shopping cart.

The online system 140 may collect (e.g., via the item search module 260 or some other module of the online system 140) feedback data with information about conversion by the user of the one or more items for the ingredient. The online system 140 may tune (e.g., via the item search module 260 or some other module of the online system 140), based on the collected feedback data, one or more weights associated with the weighted sum.

Embodiments of the present disclosure are directed to the online system 140 that queries an item database to find items that match ingredients for a recipe page. The search for items is optimized to find the most relevant items for the given ingredients of the recipe.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, comprising:
  receiving, from a device associated with a user of an online system, a query for an ingredient of a recipe;

identifying, based on one or more attributes in the query, a set of candidate items for the ingredient;

generating a recipe relevance score for each candidate item from the set of candidate items by applying a weighted sum of a plurality of scores associated with each candidate item, the recipe relevance score indicative of a relevancy of each candidate item for the recipe, wherein applying the weighted sum comprises:

scaling an embedding score for each candidate item with a first weight assigned to the embedding score to generate a first weighted score of the plurality of scores, the embedding score indicative of a relevance for the user of each candidate item to the query and of a likelihood of conversion by the user of each candidate item, scaling a classification score for each candidate item with a second weight assigned to the classification score to generate a second weighted score of the plurality of scores, the classification score indicative of a relevance class of a plurality of relevance classes to which each candidate item belongs, scaling a Boolean variable with a number of words in the query and a third weight assigned to each candidate item to generate a third weighted score of the plurality of scores, the Boolean variable indicative of whether each candidate item represents a complete match for the query, and aggregating the first weighted score, the second weighted score and the third weighted score to generate the recipe relevance score for each candidate item;

ranking, based on the recipe relevance score for each candidate item, the set of candidate items to generate a ranked list of items;

selecting, from a final version of the ranked list of items, one or more items for presentation to the user;

generating a user interface of the device that includes the selected one or more items; and causing the device associated with the user to display the generated user interface with a recipe page including the ingredient and the selected one or more items that match the ingredient.

2. The method of claim 1, further comprising:

identifying that each candidate item represents the complete match for the query when a plurality of words in the query are present within a set of keywords of each candidate item.

3. The method of claim 1, further comprising:

accessing a classification model, wherein the classification model is a machine-learning model trained to identify a likelihood of classification of each candidate item into each relevance class of the plurality of relevance classes, each relevance class associated with a type of relevance to the query;

applying the classification model to the query and one or more features of each candidate item to generate an intermediate classification score associated with each relevance class for each candidate item, the intermediate classification score being indicative of the likelihood of classification; and generating, based on the intermediate classification score associated with each relevance class, the classification score for each candidate item that is indicative of a type of relevance of each candidate item to the query.

4. The method of claim 1, further comprising:

generating one or more filters from the query; and filtering, using the one or more filters, at least one item from the ranked list of items to generate the final version of the ranked list of items.

5. The method of claim 4, wherein generating the one or more filters comprises:

extracting one or more brand names from a string associated with the ingredient;

fetching, from a database of the online system, one or more brand identifiers associated with the one or more brand names; and generating, based on the one or more brand identifiers, the one or more filters.

6. The method of claim 4, wherein generating the one or more filters comprises:

extracting one or more health-related tags from a string associated with the ingredient; and generating, based on the one or more health-related tags, the one or more filters.

7. The method of claim 1, wherein:

selecting the one or more items comprises selecting, from the final version of the ranked list of items, an item having a highest recipe relevance score among all items in the final version of the ranked list of items; and generating the user interface comprises generating the user interface including the ingredient and the selected item that matches the ingredient.

8. The method of claim 1, wherein:

selecting the one or more items comprises selecting, from the final version of the ranked list of items, a set of items having highest recipe relevance scores among all items in the final version of the ranked list of items; and generating the user interface comprises generating the user interface including the ingredient and the selected set of items representing a ranked list of matches for the ingredient allowing the user to add any of the selected set of items to a shopping cart.

9. The method of claim 1, further comprising:

collecting feedback data with information about conversion by the user of the one or more items for the ingredient; and tuning, based on the collected feedback data, one or more weights associated with the weighted sum.

10. A computer program product comprising a non-transitory computer readable storage medium having instructions encoded thereon that, when executed by a processor, cause the processor to perform steps comprising:

receiving, from a device associated with a user of an online system, a query for an ingredient of a recipe;

identifying, based on one or more attributes in the query, a set of candidate items for the ingredient;

generating a recipe relevance score for each candidate item from the set of candidate items by applying a weighted sum of a plurality of scores associated with each candidate item, the recipe relevance score indicative of a relevancy of each candidate item for the recipe, wherein applying the weighted sum comprises:

scaling an embedding score for each candidate item with a first weight assigned to the embedding score to generate a first weighted score of the plurality of scores, the embedding score indicative of a relevance for the user of each candidate item to the query and of a likelihood of conversion by the user of each candidate item, scaling a classification score for each candidate item with a second weight assigned to the classification score to generate a second weighted score of the plurality of scores, the classification score indicative of a relevance class of a plurality of relevance classes to which each candidate item belongs, scaling a Boolean variable with a number of words in the query and a third weight assigned to each candidate item to generate a third weighted score of the plurality of scores, the Boolean variable indicative of whether each candidate item represents a complete match for the query, and aggregating the first weighted score, the second weighted score and the third weighted score to generate the recipe relevance score for each candidate item;

ranking, based on the recipe relevance score for each candidate item, the set of candidate items to generate a ranked list of items;

selecting, from a final version of the ranked list of items, one or more items for presentation to the user;

generating a user interface of the device that includes the selected one or more items; and causing the device associated with the user to display the generated user interface with a recipe page including the ingredient and the selected one or more items that match the ingredient.

11. The computer program product of claim 10, wherein the instructions further cause the processor to perform steps comprising:

accessing a classification model, wherein the classification model is a machine-learning model trained to identify a likelihood of classification of each candidate item into each relevance class of the plurality of relevance classes, each relevance class associated with a type of relevance to the query;

applying the classification model to the query and one or more features of each candidate item to generate an intermediate classification score associated with each relevance class for each candidate item, the intermediate classification score being indicative of the likelihood of classification; and generating, based on the intermediate classification score associated with each relevance class, the classification score for each candidate item that is indicative of a type of relevance of each candidate item to the query.

12. The computer program product of claim 10, wherein the instructions further cause the processor to perform steps comprising:

generating one or more filters from the query; and filtering, using the one or more filters, at least one item from the ranked list of items to generate the final version of the ranked list of items.

13. The computer program product of claim 12, wherein the instructions further cause the processor to perform steps comprising:

extracting one or more brand names from a string associated with the ingredient;

fetching, from a database of the online system, one or more brand identifiers associated with the one or more brand names; and generating, based on the one or more brand identifiers, the one or more filters.

14. The computer program product of claim 12, wherein the instructions further cause the processor to perform steps comprising:

extracting one or more health-related tags from a string associated with the ingredient; and generating, based on the one or more health-related tags, the one or more filters.

15. The computer program product of claim 10, wherein the instructions further cause the processor to perform steps comprising:

selecting, from the final version of the ranked list of items, an item having a highest recipe relevance score among all items in the final version of the ranked list of items; and generating the user interface including the ingredient and the selected item that matches the ingredient.

16. The computer program product of claim 10, wherein the instructions further cause the processor to perform steps comprising:

selecting, from the final version of the ranked list of items, a set of items having highest recipe relevance scores among all items in the final version of the ranked list of items; and generating the user interface including the ingredient and the selected set of items representing a ranked list of matches for the ingredient allowing the user to add any of the selected set of items to a shopping cart.

17. The computer program product of claim 10, wherein the instructions further cause the processor to perform steps comprising:

collecting feedback data with information about conversion by the user of the one or more items for the ingredient; and tuning, based on the collected feedback data, one or more weights associated with the weighted sum.

18. A computer system comprising:

a processor; and a non-transitory computer-readable storage medium having instructions that, when executed by the processor, cause the computer system to perform steps comprising:

receiving, from a device associated with a user of an online system, a query for an ingredient of a recipe;

identifying, based on one or more attributes in the query, a set of candidate items for the ingredient;

generating a recipe relevance score for each candidate item from the set of candidate items by applying a weighted sum of a plurality of scores associated with each candidate item, the recipe relevance score indicative of a relevancy of each candidate item for the recipe, wherein applying the weighted sum comprises:

scaling an embedding score for each candidate item with a first weight assigned to the embedding score to generate a first weighted score of the plurality of scores, the embedding score indicative of a relevance for the user of each candidate item to the query and of a likelihood of conversion by the user of each candidate item, scaling a classification score for each candidate item with a second weight assigned to the classification score to generate a second weighted score of the plurality of scores, the classification score indicative of a relevance class of a plurality of relevance classes to which each candidate item belongs, scaling a Boolean variable with a number of words in the query and a third weight assigned to each candidate item to generate a third weighted score of the plurality of scores, the Boolean variable indicative of whether each candidate item represents a complete match for the query, and aggregating the first weighted score, the second weighted score and the third weighted score to generate the recipe relevance score for each candidate item;

ranking, based on the recipe relevance score for each candidate item, the set of candidate items to generate a ranked list of items;

selecting, from a final version of the ranked list of items, one or more items for presentation to the user;

generating a user interface of the device that includes the selected one or more items; and causing the device associated with the user to display the generated user interface with a recipe page including the ingredient and the selected one or more items that match the ingredient.

\* \* \* \* \*